US005435951A

United States Patent [19]

Toncelli

[11] Patent Number: 5,435,951

[45] Date of Patent: Jul. 25, 1995

[54] PROCESS FOR PRODUCING A SLAB OF STONY MATERIAL

[76] Inventor: Luca Toncelli, Viale Asiago 34, 36061 Bassano del Grappa, Vicenza, Italy

[21] Appl. No.: 209,832

[22] Filed: Mar. 11, 1994

Related U.S. Application Data

[62] Division of Ser. No. 884,951, May 18, 1992, Pat. No. 5,338,179.

[30] Foreign Application Priority Data

May 31, 1991 [IT] Italy ............................ TV91A0061

[51] Int. Cl.[6] ........................ B28B 1/08; B28B 13/02; B29C 43/22

[52] U.S. Cl. ..................................... 264/69; 264/333; 425/447; 425/449

[58] Field of Search ..................... 264/69, 71, 72, 333; 425/447, 449

[56] References Cited

U.S. PATENT DOCUMENTS

| | | | |
|---|---|---|---|
| 1,594,310 | 7/1926 | Long et al. | 264/69 X |
| 2,235,001 | 3/1941 | Allen | 264/69 |
| 2,264,948 | 12/1941 | McKenzie | 264/69 |
| 3,601,870 | 8/1971 | Jones . | |
| 3,663,137 | 5/1972 | Haas et al. . | |
| 3,929,173 | 12/1975 | Mauroner . | |
| 4,093,411 | 6/1978 | Lee . | |
| 4,141,946 | 2/1979 | Rauenhorst | 264/69 |
| 4,340,351 | 7/1982 | Owens | 264/69 X |
| 4,408,978 | 10/1983 | Owens | 264/69 X |
| 4,496,504 | 1/1985 | Steenson et al. | 264/69 |

FOREIGN PATENT DOCUMENTS

| | | | |
|---|---|---|---|
| 2838 | 7/1979 | European Pat. Off. | 264/69 |
| 2431361 | 3/1980 | France | 264/69 |
| 403651 | 3/1974 | U.S.S.R. | 264/69 |
| 1148788 | 4/1985 | U.S.S.R. | 264/69 |

*Primary Examiner*—Karen Aftergut
*Attorney, Agent, or Firm*—McAulay Fisher Nissen Goldberg & Kiel

[57] ABSTRACT

A process for producing a slab of stony material by filling of a mold (42) with a mixture of stony material for the realization of a slab of the material, supplying the mixture with a volumetric distributor with rotating blades (92) and moving the volumetric distributor from a first end to the other end of the mold (42) and then returning the distributor to the first end with the blades (92) in a swinging motion or angle widening motion, and stopping the distributor for a prefixed period of time at each end, during which time the blades (92) are given a limited rotation in the direction of the stopped end.

20 Claims, 6 Drawing Sheets

PROCESS FOR PRODUCING A SLAB OF STONY MATERIAL

This is a division of application Ser. No. 07/884,951 filed on May 18, 1992, now U.S. Pat. No. 5,338,179 dated Aug. 16, 1994.

FIELD OF THE INVENTION

The present invention relates to a process for carrying out the filling of a mold with a mixture of stony material for the realization of a slab of said material, as well as to an apparatus for realizing said process. The process as well as the apparatus in question are suitable for the preparation of a mold correctly filled, both where the stony material has been bound with polymers at the liquid stage or with cements.

It is known that the filling of a mold or of a formwork with a mixture of stony material and polymer or cement constitutes one of the most delicate operations of the productive process of the slabs.

DESCRIPTION OF RELATED ART

Presently, for carrying out the above filling, the material is fed into the mold by means of a suitable distribution means, which may be for instance vertically movable panels receiving the mixture from the mixing and preparing units through feeding belts.

This operating manner presents disadvantages deriving from the fact that the filling of the mold is hardly uniform and complete, so that the final product obtained, that is to say the slab, is compact and its three sizes are of a constant value, so that the slab consists of an aesthetically and functionally acceptable article.

Among the disadvantages more often found are listed an insufficient filling of the mold in correspondence with its ends, or an overdosage of material from the edges towards the center of the mold.

Said disadvantages often happen simultaneously, so that resultant thickness of the slab will be variable and render the obtained product unacceptable.

SUMMARY OF THE INVENTION

Now there have been realized an apparatus and a process which has the subject of the present invention, for carrying out the filling of a mold with a mixture of stony material, so that all the above-mentioned disadvantages are overcome.

Therefore, one of the aims of the present invention consists in providing an original filling process of a mold with a mixture of stony material, by means of which the above filling is realized in a perfectly uniform manner from one end to the other of the mold, particularly because of a suitable succession of operating steps, through which is attained both the correct filling of the ends of the mold and of the portion of the mold between said ends, said fillings being attained in a different manner by modifying the operating methods of the used supplying means.

Another aim of the present invention is to provide a process as above defined, thanks to which the filling of the above-mentioned portion of the mold between its ends is actuated in two succeeding periods of time, in the first the mixture being supplied to said portion, whereas in the second the supplied filling quantity undergoes a levelling action and substantially also a compactness action, as to render said portion tridimensionally constant in its sizes.

The aforesaid aims, as well as others which will become clear in the following of the present description, are reached by means of the process forming the subject of the present invention being characterized by comprising the following operating steps consisting in:

1) placing a distributor with rotating blades above an end of the mold and maintaining it in said position for a fixed period of time, during which it supplies the mixture to the mold, while said blades are set in a rotating motion whose sense being so, that the blades essentially rotate in a direction towards the other end of the mold;
2) forward moving of said distributor up to the second end of the mold, while the blades are maintained in rotation according to the sense indicated in step 1);
3) stopping the forward moving motion of the distributor, once it has taken place in correspondence with the second end of the mold by maintaining the rotation of the blades for a prefixed period of time always according to the sense indicated in step 1);
4) keeping the distributor stopped in the position reached in step 3) and changing the sense of rotation of its blades with respect to that indicated in step 1) by maintaining them in rotation for a prefixed period of time;
5) operating the forward moving motion of the distributor from the second end up to the first end of the mold;
6) setting the blades of the distributor, for the whole period of time of step 5), in a swinging rotating motion of an angle of a prefixed wideness;
7) stopping the forward movement of the distributor, once it has taken place in correspondence with said first end of the mold, by simultaneously stopping said swinging movement of the blades;
8) keeping stopped the distributor in the position reached in step 7) for a prefixed period of time, whereas during this period its blades are set in a rotation motion in a contrary sense with respect to that of step 1).

Another purpose of the present invention is to provide an apparatus for realizing the above-mentioned process which apparatus is simple in construction and functions reliably.

The apparatus in question is for this purpose characterized by comprising a fixed frame supporting the mold which is to be filled with the mixture of stony material, as well as by a movable frame displaceable on said fixed frame above said mold and supporting supplying means of the mixture to the mold provided, inside a collecting room for the mixture, of rejecting means of the same from the room being rotating and/or oscillating, being fastened, above the mold, a series of metal rods substantially extending in a transverse direction with respect to that of shifting of the movable frame.

The characteristics as well as the advantages of the process and of the apparatus according to the present invention will be evident from the following detailed description, given as a not limited example of the process and of a preferred embodiment of the apparatus, which description is made referring to the enclosed figures, wherein:

DESCRIPTION OF THE PREFERRED EMBODIMENT

It is first described, only for reasons of greater expository clarity, the preferred embodiment of the apparatus according to the present invention.

Figure 1:
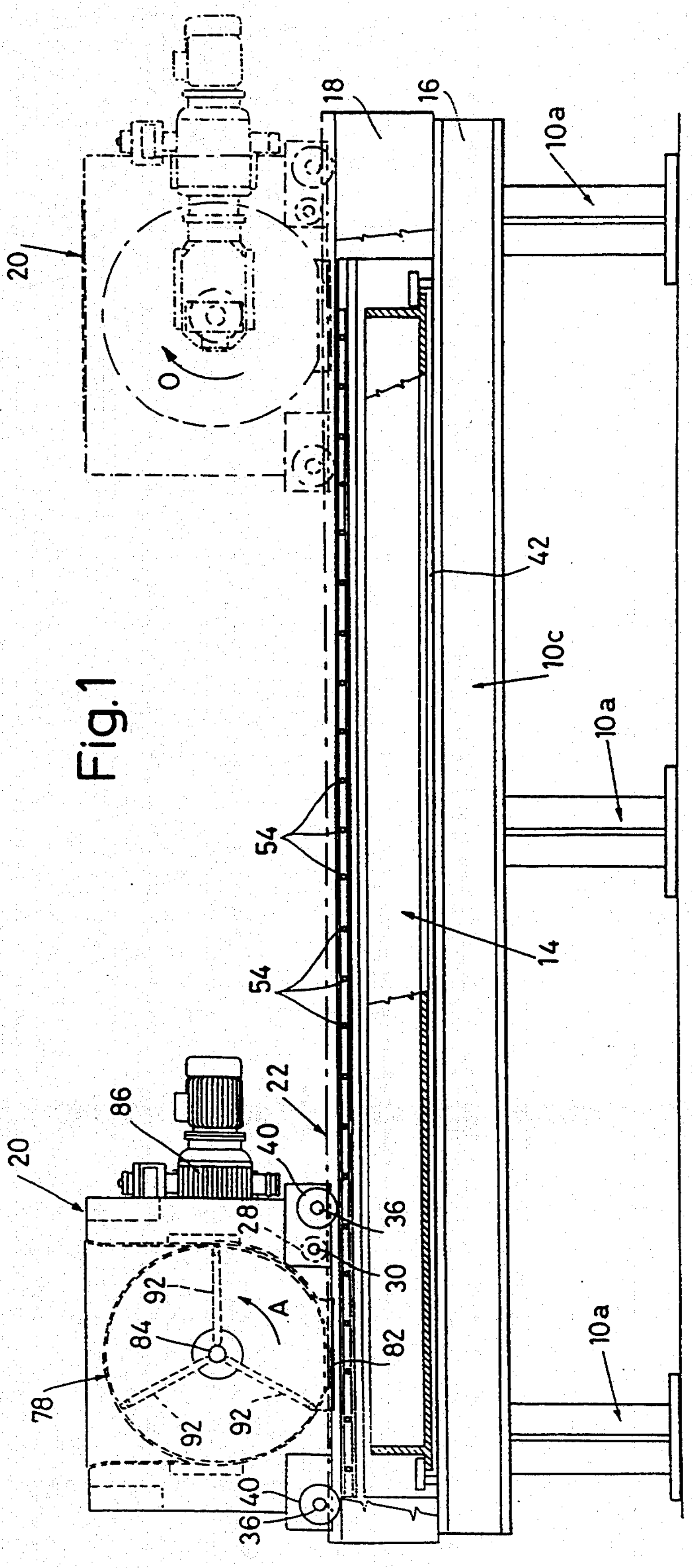
FIG. 1 is a side view, partially in section, of the apparatus according to the present invention.
Figure 2:
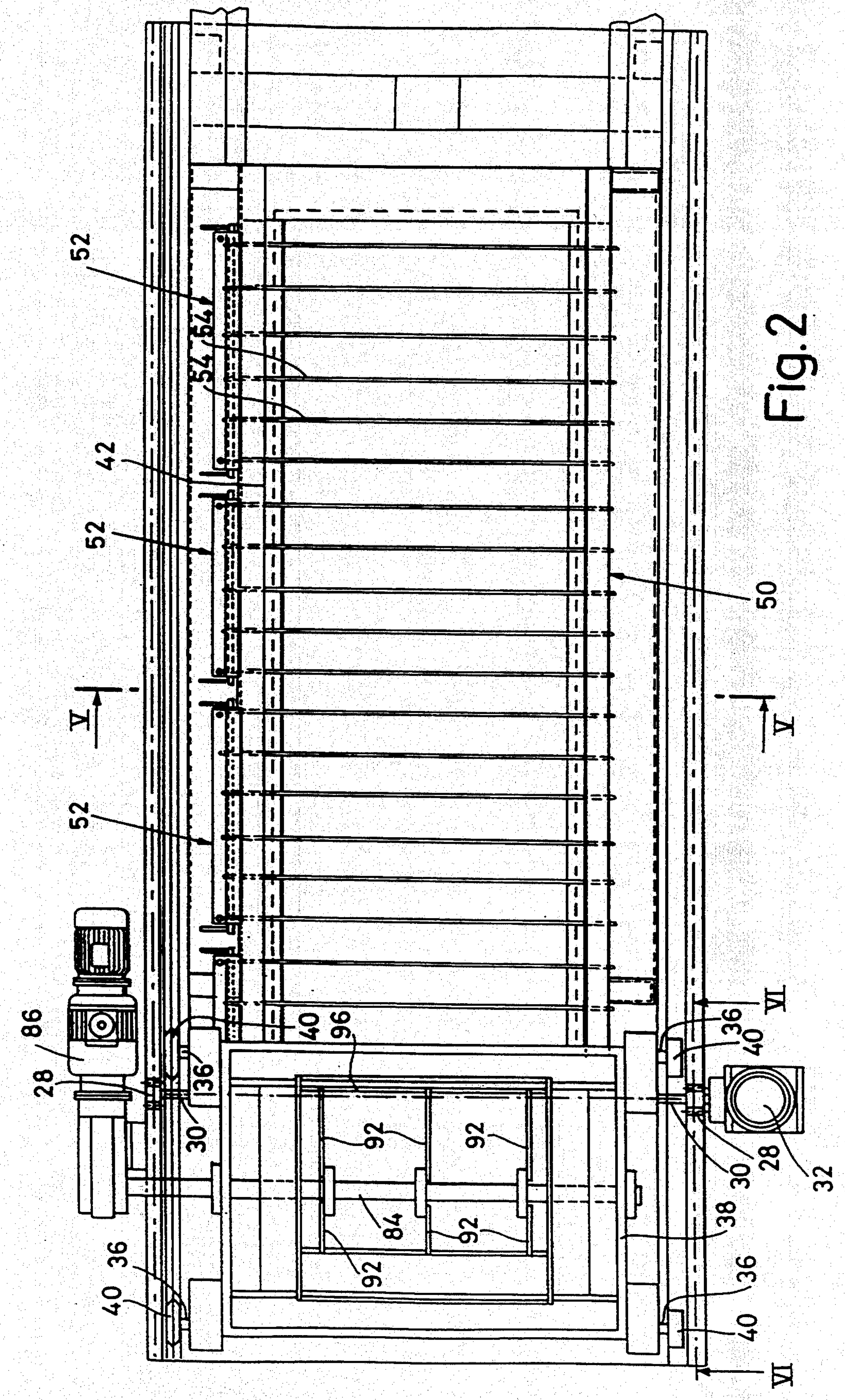
FIG. 2 is a plan view of the apparatus according to the invention.
Figure 3:
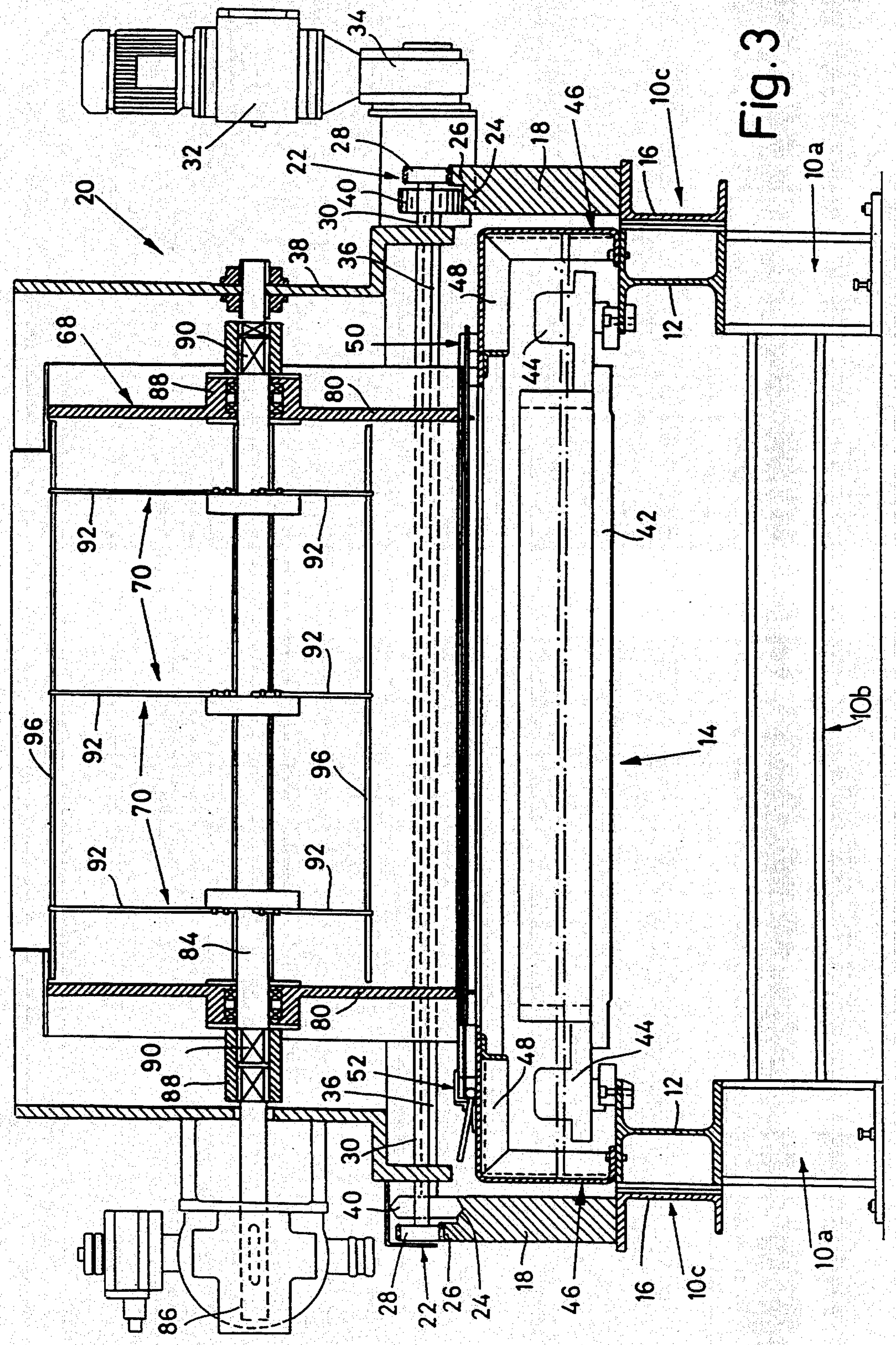
FIG. 3 is a view of the apparatus according to section III—III of FIG. 6.
Figure 4:
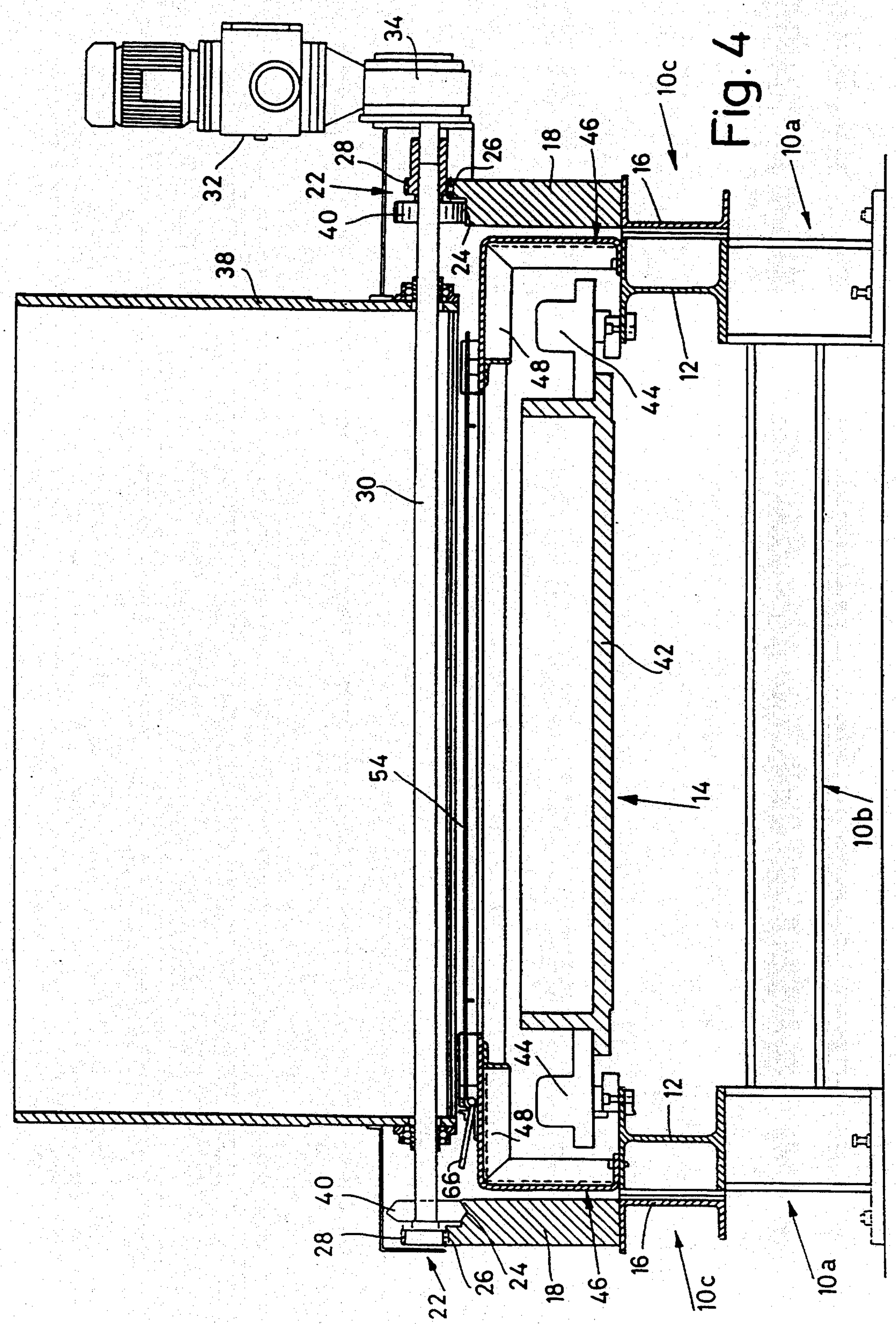
FIG. 4 is a view of the apparatus according to section IV—IV of FIG. 6.
Figure 5:
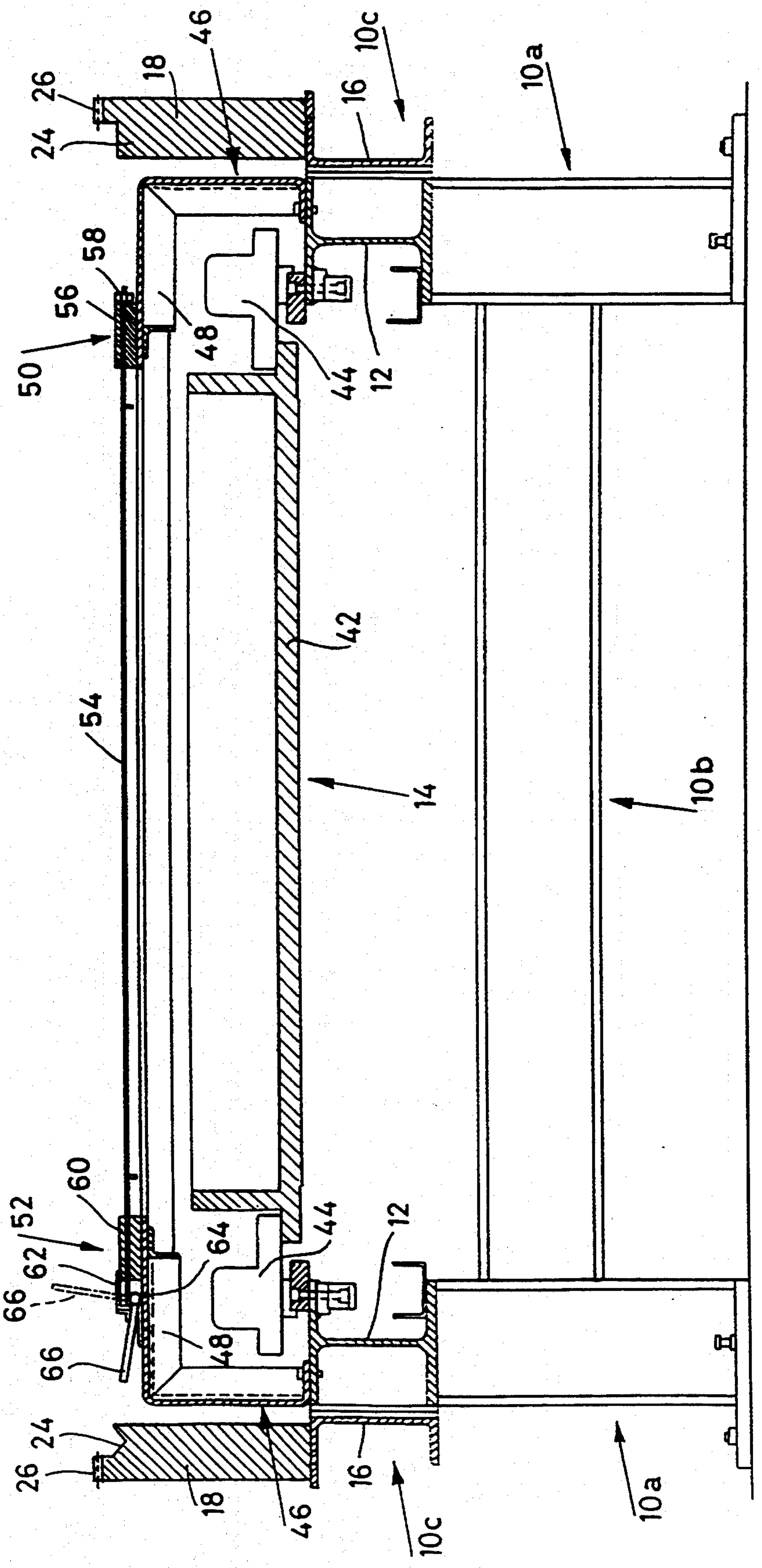
FIG. 5 is a view of the apparatus according to section V—V of FIG. 2.

With particular reference to FIGS. 1 to 3, the abovecited apparatus comprises a fixed frame essentially consisting of supporting rods 10*a*, beams 10*b* and sills 10*c*. Each of these latter comprises a metal bar having a double T shape 12, whose lower side is fastened in any known manner to the upper end of rods 10*a*, whereas to its upper side is connected, as explained later on, the mold which is to be filled with the mixture of stony material and which are indicated in its whole with reference numeral 14 and the arrow.

To the outer side of each of the sills 10*c* is fastened, always in the known manner, a metal bar having a C shape 16 supporting above a guiding rail 18. The two guiding rails 18 allow the to and fro shifting of the supplying means of mold 14, which will be described in detail further on and which, at the moment, are indicated in their whole with reference numeral 20.

The two end positions, between which said supplying means 20 move on rails 18, are illustrated with a continuous line on the left and with a dotted line on the right in FIG. 1. As seen in particular in FIGS. 2 to 6, the upper edge of rails 18 provides a rack 22 on the outer side thereof and a sliding guide 24 on the inner side thereof. A couple or unit composed of rack 22—sliding guide 24 is provided on each side of the supplying means 20, so that the forward movement and the backward movement of said means takes place in a uniform manner. Each of racks 22 consists of a toothed upper edge 26 of the rails 18, with which is engaged a toothed wheel 28. Both toothed wheels 28 of each rack 22 are keyed on a common shaft 30 transversely extending to said supplying means 20, said shaft being linked, by means of a reduction unit 34, with a driving motor 32.

Sliding wheels 40 are carried, which is parallel to said shaft 30 and fastened to said frame 38 supporting said supplying means 20, which wheels are applied freely rotating, and the sliding wheels 40 are destinated to roll without sliding on guides 24. Obviously, shaft 30, which has to control the rotation of the toothed wheels 28, will be supported, freely rotating, by frame 38 of supplying means 20. As particularly seen in FIGS. 2 to 4, there are provided two couples of wheels 40, respectively. One pair of wheels 40 is at the front end and the other pair of wheels 40 is at the back end of frame 38 and, while those wheels 40 which are placed on one side of said frame 38 have a cylindrical shape, those foreseen or placed on the opposite side of frame 38 show a tapered edge while being housed in sliding seat 24 of complementary shape, and this always for the purpose or aim of keeping uniform the movement of supplying means 20.

As is seen in particular in FIGS. 2 to 5, mold 14 consists, in the considered exemplifying embodiment, of a formwork container 42, which however could be replaced alternatively by a rim leaning to a band. Container 42 is supported at its ends by supporting shelves 44 fastened, in turn, to the upper side of the bars having a double T-shape 12. To the same side of said bars 12 is fastened in any known manner a shelf having an L-shape 46 turned up, on whose upper horizontal side 48 are placed blocking clamps 50,52 of metal rods 54 transversally extending above formwork 42 being substantially parallel and uniformly spaced between them. In FIG. 2 it is seen that clamp 50 is unique, whereas clamps 52 are three in the considered exemplifying embodiment, and these clamps are more clearly illustrated in FIG. 5, wherefrom it is seen that clamp 50 consists of a metal bar 56, wherein is inserted one end of rods 54 which, being threaded, permits the application of a blocking nut 58. Also each clamp 52 consists of a metal bar 60 with an analogue blocking having a nut 58, which however, in this case, engages a movable striker 62 being moved away from bar 60, putting into tension rods 54 linked therewith , for the rotation of a cam 64, thanks to an anticlockwise rotation of a control lever 66, whereto is fastened said cam 64.

The supplying means 20, more clearly visible in FIGS. 1 to 4 and 6, comprise a volumetric mixture distributor, which essentially consists of a stator 68, in whose inner part is rotating a rotor 70. The stator 68 consists of a semicylindrical room 72 (FIG. 6) being upwards open, whose body extends above in two longitudinal plane walls 74, substantially parallel between them and having the same length as room 72, being linked with the ends by a couple of transverse walls 76 limiting, with the longitudinal walls 74, a loading hopper 78 of the mixture in the distributor. Room 72 is closed at the ends by a couple of essentially circular sheets 80.

Figure 6:
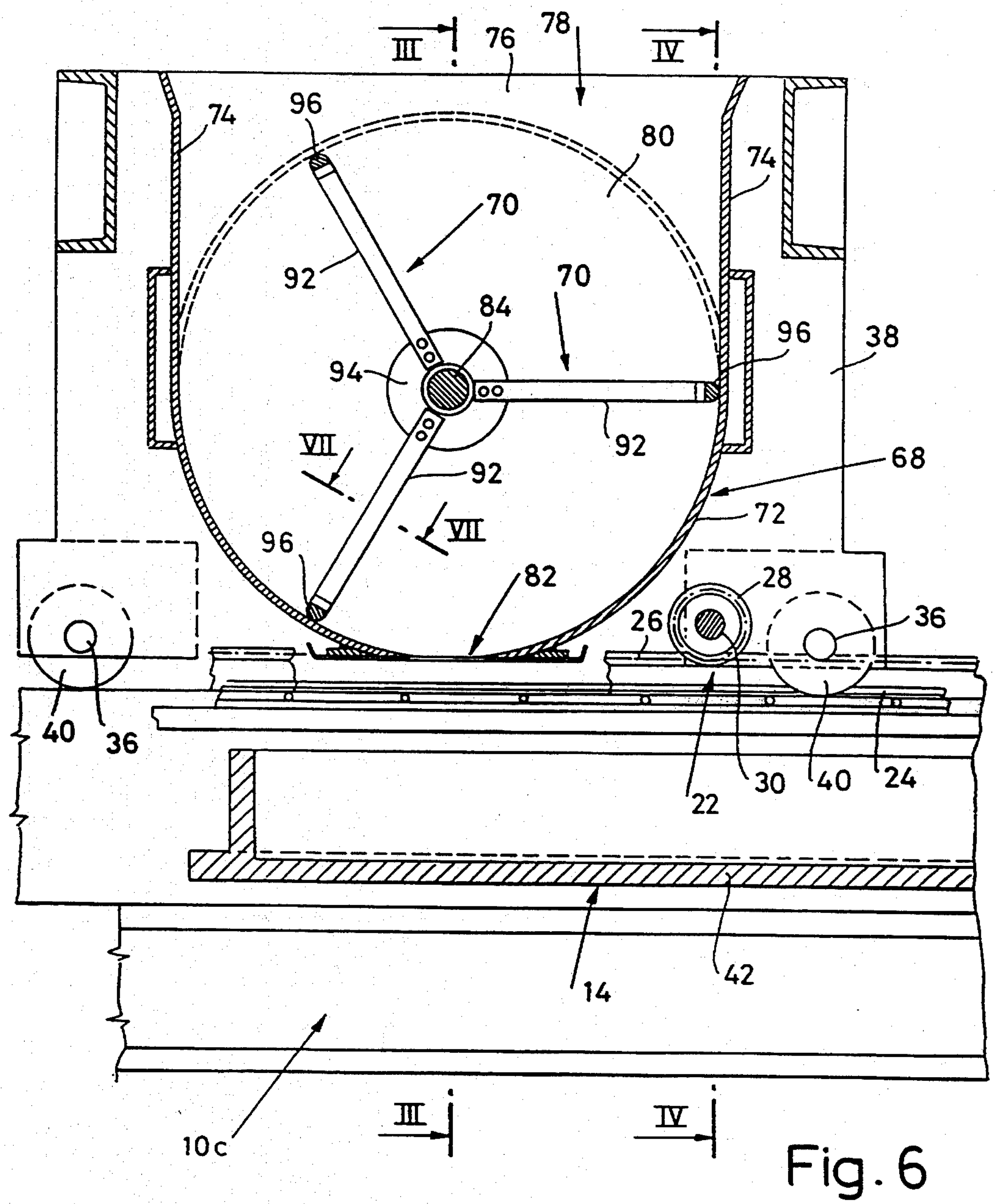
FIG. 6 is a view of the apparatus according to section VI—VI of FIG. 2.

As more particularly seen in FIG. 6, room 72 is underneath provided with an unloading hopper 82, known in itself, being released when the distributor is being arranged on mold 42. Advantageously, hopper 82 is of the same length as room 72 which, in turn, is equal to the broadness of mold 42.

Stator 68 is supported by an essentially horizontal shaft 84 freely rotating at the ends in a frame 38, and is linked, at one of said ends protruding from said frame, with a controlling motor 86 being fed when rotor 70 has to be rotated.

Shaft 84 crosses centrally said sheets 80, and in correspondence thereof is inserted said shaft, by means of the interposition of ball bearings 90, into coupling joints 88 fixed to the sheets 80 and protruding externally from these latter.

Rotor 70 comprises a series of radial blades 92 being assembled, in the considered exemplyfing embodiment, in three series, each of them having three blades. It is, however, obvious that the number of the series as well as that of the blades for each series could vary.

As is particularly seen in FIGS. 2, 3 and 6, the series of blades 92 are equidistant between them, and the blades of each series are parallel to those of the others. It is, moreover, noted that the blades of each series are staggered between them at angles of 120°.

As especially seen in FIG. 6, blades 92 are fastened at one end in any known manner, for instance by screws, rivets or the like, to an annular body 94 keyed on shaft 84.

According to one of the particularly advantageous features of the invention, the other ends of the blades 92 are linked with a metal rod 96 fastened to the same, whose length (FIGS. 2 and 3) is equal to the distance separating said blades 80. Rods 96 have been realized in a material particularly resistent to corrosion, such as stainless steel or the like, for avoiding pollutions of the mixture. Among the functions granted to rods 96 is particularly listed that of carrying out a scraping action of the inner wall of room 72 aiding the supply of the mixture from the latter and allowing that the entire quantity of the mixture contained in the distributor is supplied to mold 42.

Figure 7:
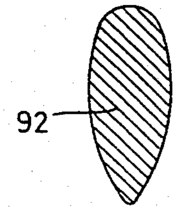
FIG. 7 is a sectional view of a rotating blade.

According to another advantageous feature of the invention, as particularly seen in FIG. 7, blades 92 show, in transverse section, a shape being of the type of an airplane wing having its larger size transversely placed in its sense of rotation so that a major size of the blades 92 is essentially transverse to the direction of their rotation. This has the aim of avoiding rabblings of the mixture and of allowing the blades to accompany and push the same towards unloading hopper 82.

According to a further advantageous feature of the present invention, the distributor of the mixture is filled with a quantity of mixture being slightly in surplus with respect to the volume of the mold full to the brim for assuring a complete and correct filling thereof. For this aim, the apparatus according to the invention comprises, in correspondence of the left end of mold 42 (FIG. 1), a not represented known weighing station, by means of which, prior to each function cycle, the volumetric distributor for the supply of the mixture is weighed.

The process according to the present invention provides, for the realization of each slab, a cycle of operative steps, as hereafter described with reference to the attached figures.

Once the volumetric distributor has been filled, weighed, it is set up in the position as represented on the left with a continuous line in FIG. 1, until it is positioned above the end of mold 42. At this moment, its unloading hopper 82 remains free, so that the mixture starts being supplied to mold 42. Simultaneously, driving motor 86 is fed for causing rotation of the blades 92 of rotor 70 of the volumetric distributor. The rotation takes place in an anticlockwise sense, as indicated by arrow A of FIG. 1. The stationing of the distributor thus activated in the above-mentioned position is kept for a relatively short period of time, for instance one or two seconds.

Now controlling motor 32 is fed in such a manner that the distributor, sliding on rails 18 by means of racks 22, forward moves towards the right side looking at FIG. 1, the forward moving being directed to the other end of mold 42. During this forward movement blades 92 are constantly kept in rotation.

The distributor is stopped, interrupting the feeding of motor 32, when the same is in the right side position of FIG. 1, shown in a dotted line outline, wherein it is placed above the second end of mold 42. The feeding of motor 86 is maintained for a short period of time, so that blades 92 carry out, when the distributor is stopped, a limited rotation of about a fraction of a turn.

At this moment, always with the distributor stopped, not represented known means, associated to motor 86, control the inversion of the rotation sense thereof becoming thus clockwise, as indicated by arrow O of FIG. 1. Also this rotation is of a relatively limited amount, for instance of about a rotation of 360° of blades 92. The whole period of time of the stationing of the distributor is, in this phase, substantially equal to that of the stopping at the other end, for instance of about one or two seconds.

This operative phase assumes a considerable importance, since therewith is assured the correct filling of the interested end.

Always by means of not represented known means is now newly fed motor 32 having a contrary sense of rotation with respect to the preceding one, so that the distributor moves forward in the contrary sense, in this case directed to the first end of mold 42, until it reaches the same. During this forward movement motor 86 is prearranged, by means of not represented known means associated thereto, or interposed between said motor and shaft 84, for giving blades 92 an oscillating rotation movement of a prefixed wideness, for instance of 30°. This combination of forward moving of the distributor and the oscillation of one of blades 92 is very important, if seen also in association with the function of rods 54 which are linked with mold 42 and of rods 96 which are linked with blades 92. A levelling action and substantial precompressing of the mixture in the area of mold 42 comprised between its ends.

Once the distributor has reached the first end of mold 42, the feeding of motor 32 is interrupted by stopping the distributor which is caused to remain in the stopped position for a relatively short period of time, for instance of one or two seconds, for performing the last operative step of the process. Always thanks to the above-cited means associated with motor 86, the oscillating movement of blades 92 is interrupted, causing them again to rotate in the clockwise sense, for instance for a period of time sufficient to accomplish two rotations of 360°. This step is very important, since therewith is assured the correct filling of the now being interested end.

Once finished the above-related phase, motor 86, and thus blades 92, are stopped, and the distributor is returned to the weighing station.

From the aforesaid appear obvious the advantages to be carried out with the process and the apparatus forming the object of the present invention as to a uniform filling of mold 42, bearing also in mind the limited loading surplus of the distributor.

Finally, it is clear that variations and/or modifications may be brought to the process and the apparatus forming the subject matter of the present invention, without departing from the scope thereof.

I claim:

1. A process for uniform filling of a mold having first and second spaced ends with a mixture comprising stony material and a polymer or cement to produce a slab containing stony material, comprising:

1) filling a distributor having rotating blades with the mixture and placing the distributor above the first end of the mold and maintaining the distributor in the position above the first end of the mold for a prefixed period of time, during which the distributor supplies the mixture to the mold, while imparting a rotating motion to the blades in a first direction;

2) forwardly moving the distributor from the first end to the second end of the mold, while the blades are kept in rotation according to the first direction of rotation;

3) stopping the forward movement of the distributor from the first end of the mold to the second end of the mold, once the distributor is in correspondence with the second end of the mold and keeping the blades in rotation for a prefixed period of time always according to the first direction of rotation;
4) keeping the distributor stopped in the position reached at the second end in step 3) and reversing the direction of rotation of the distributor blades with respect to the first direction of rotation and rotating the blades in a second direction of rotation opposite to the first direction and keeping the blades in rotation in the second direction for a prefixed period of time;
5) controlling forward movement of the distributor from the second end of the mold to the first end, until the distributor reaches the first end of the mold;
6) setting the blades of the distributor during the forward movement from the second end to the first end of the mold, for the entire period of time of step 5), in an oscillating rotational movement through an angle of a prefixed angular width;
7) stopping the oscillating rotational movement of the blades in step 5) simultaneously with a stopping of the forward movement of the distributor from the second end to the first end, once the distributor is in correspondence with the first end of the mold; and
8) keeping the distributor stopped in the position reached in step 7) at the first end of the mold for a prefixed period of time, and during this prefixed period of time setting the blades in a contra rotation movement in a contra direction with respect to the first direction of rotation of the blades in step 1), such that the mold is uniformly filled with the mixture without material accumulation towards the ends of the mold.

2. The process according to claim 1, comprising keeping the distributor in the position for a prefixed period of one to two seconds at the first end of the mold according to step 1).

3. The process according to claim 1, comprising keeping the distributor in the position at the second end of the mold for at least one to two seconds.

4. The process according to claim 2, comprising keeping the distributor in the position at the second end of the mold for at least one to two seconds.

5. The process of claim 1, comprising keeping the blades in rotation according to the first direction with the distributor staying in correspondence with the second end of the mold for a period of time sufficient to rotate the blades at least a fraction of 360° of a turn to prevent material accumulation towards the ends of the mold and to render the filling uniform.

6. The process of claim 2, comprising keeping the blades in rotation according to the first direction with the distributor staying in correspondence with the second end of the mold for a period of time sufficient to rotate the blades at least a fraction of 360° of a turn to prevent material accumulation towards the ends of the mold and to render the filling uniform.

7. The process of claim 3, comprising keeping the blades in rotation according to the first direction with the distributor staying in correspondence with the second end of the mold for a period of time sufficient to rotate the blades at least a fraction of 360° of a turn to prevent material accumulation towards the ends of the mold and to render the filling uniform.

8. The process according to claim 1, comprising keeping the blades in rotation in the second direction contrary to that of the first direction with the distributor staying in correspondence with the second end of the mold for a sufficient length of time to rotate the blades at least 360°.

9. The process according to claim 2, comprising keeping the blades in rotation in the second direction with the distributor staying in correspondence with the second end of the mold for a sufficient length of time to rotate the blades at least 360°.

10. The process according to claim 3, comprising keeping the blades in rotation in the second direction with the distributor staying in correspondence with the second end of the mold for a sufficient length of time to rotate the blades at least 360°.

11. The process according to claim 1, comprising setting the width of the angle of the oscillating rotating movement of the blades during step 6) to at least 30°.

12. The process according to claim 2, comprising setting the width of the angle of the oscillating rotating movement of the blades during step 6) to at least 30°.

13. The process according to claim 3, comprising setting the width of the angle of the oscillating rotating movement of the blades during step 6) to at least 30°.

14. The process according to claim 1, comprising the step of keeping the distributor in correspondence with the first end of the mold according to step 8), for a period of one to two seconds to prevent material accumulation towards the ends of the mold and to render the filling uniform.

15. The process according to claim 2, comprising the step of keeping the distributor in correspondence with the first end of the mold according to step 8), for a period of one to two seconds to prevent material accumulation towards the ends of the mold and to render the filling uniform.

16. The process according to claim 3, comprising the step of keeping the distributor in correspondence with the first end of the mold according to step 8), for a period of one to two seconds to prevent material accumulation towards the ends of the mold and to render the filling uniform.

17. The process according to claim 1, comprising the step of keeping the distributor in correspondence with the first end of the mold according to step 8), for a period of time to rotate the blades for at least two turns of 360°.

18. The process according to claim 2, comprising the step of keeping the distributor in correspondence with the first end of the mold according to step 8), for a period of time to rotate the blades for at least two turns of 360°.

19. The process according to claim 3, comprising the step of keeping the distributor in correspondence with the first end of the mold according to step 8), for a period of time to rotate the blades for at least two turns of 360°.

20. The process according to claim 1, comprising filling the distributor with a surplus of the mixture with respect to a volume of the mold for assuring a complete and correct filling thereof.

* * * * *